United States Patent [19]

Natarajan

[11] Patent Number: 5,146,540
[45] Date of Patent: Sep. 8, 1992

[54] PROCESSOR ALLOCATION METHOD AND APPARATUS FOR MULTIPROCESSOR EXECUTION OF A CONSTRAINT SATISFACTION SEARCH

[75] Inventor: Kadathur S. Natarajan, Millwood, N.Y.

[73] Assignee: International Business Machines Corp., Armonk, N.Y.

[21] Appl. No.: 815,634

[22] Filed: Dec. 30, 1991

Related U.S. Application Data

[63] Continuation of Ser. No. 484,034, Feb. 22, 1990.

[51] Int. Cl.$^5$ .............................................. G06F 15/18
[52] U.S. Cl. ....................................... 395/11; 395/51; 364/134
[58] Field of Search .............................. 395/11, 10, 51

[56] References Cited

PUBLICATIONS

Janakiram et al., "A Randomized Parallel Backtracking Algorithm", IEEE Trans. on Computers, 37, 12, Dec. 1988, pp. 1665-1676.
Polychronopoulos et al., "Processor Allocation for Horizontal and Vertical Parallelism and Related Speed Up Bounds," IEEE Trans. on Computers, C-36, 4, Apr. 1987, pp. 410-420.
Bokhari, S. H., "Partitioning Problems in Parallel, Pipelined, and Distributed Computing," IEEE Trans. on Computers, 37, 1, Jan. 1988, pp. 48-57.
Wah et al., "MANIP-A Multicomputer Architecture for Solving Combinatorial Extremum-Search Problems," IEEE Trans. Computers, C-33, 5, May 1984, pp. 377-390.
Sahni, S., "Scheduling Multipipeline and Multiprocessor Computers," IEEE Trans. on Computers, C-33, 7, Jul. 1984, pp. 637-645.
"Parallel Lookahead Technique for Constraint Satisfaction" IBM Technical Disclosure Bulletin, vol. 31, No. 10 Mar. 1989.
"Estimating the Size of a Backtrack Search During the Search Operation" IBM Technical Disclosure Bulletin, vol. 30, No. 8 Jan. 1988.
D. E. Knuth, "Estimating the Efficiency of Backtrack Programs", Mathematics of Computation, vol. 29, 1975, pp. 121-136.

*Primary Examiner*—Michael R. Fleming
*Assistant Examiner*—Robert W. Downs
*Attorney, Agent, or Firm*—Perman & Green

[57] ABSTRACT

Apparatus and method for minimizing, in a multiprocessor system, a variance in a search effort along different subtrees of a backtrack search tree employed for solving an instance of a constraint-satisfaction problem. A method includes the steps of (a) estimating an amount of search effort required for different subtrees of the search tree, (b) allocating an appropriate number of processors to each of the different subtrees of the search tree based upon the estimated amount of search effort, the number of processor allocated to each of the subtrees being selected to minimize a variance in search processing time along the different subtrees, and (c) executing the search with the allocated processors in parallel along the different subtrees of the search tree. The step of allocating an appropriate number of processors includes the steps of (a) dividing the search tree into N(<M) subspaces and (b) assigning the M processors to the subspaces in proportion to the estimated effort involved in searching the subspaces.

9 Claims, 3 Drawing Sheets

PROCESSOR ALLOCATION METHOD AND APPARATUS FOR MULTIPROCESSOR EXECUTION OF A CONSTRAINT SATISFACTION SEARCH

This is a continuation of copending application Ser. No. 07/484,034, filed on Feb. 22, 1990.

FIELD OF THE INVENTION

This invention relates generally to multiprocessor data processing systems and, in particular, to apparatus and processors in a multiprocessor system.

BACKGROUND OF THE INVENTION

Many problems in Artificial Intelligence and combinatorial search applications are formulated as constraint-satisfaction problems. Briefly stated, a solution of a constraint-satisfaction problem typically requires that an arbitrary set of constraints be satisfied. A search procedure is employed to enumerate all solutions that simultaneously satisfy all constraints on the problem.

Solution techniques that have been developed for this class of problems include the backtrack search algorithm. An example is found in a journal article entitled "Backtrack programming", Journal of the ACM, Vol. 12, 1965, pp. 516-524 by S. Golomb et al.

More efficient variations of this backtrack search algorithm are found in the following journal articles A. K. Mackworth, "Consistency in Networks of Relations", Artificial Intelligence, Vol. 8, pp. 99-118, 1977; R. M. Haralick and L. G. Shapiro, "The Consistent Labeling Problem: Part I", IEEE Trans. on Pattern Analysis and Machine Intelligence, Vol. 1, Apr. 1979, pp. 173-184; R. M. Haralick and G. L. Elliott, "Improving Tree Search Efficiency for Constraint Satisfaction Problems", Artificial Intelligence pp. 263-313, 1980; and J. R. Bitner and E. M. Reingold, "Backtrack Programming Techniques", Comm. of the ACM, Vol. 18, pp. 651-656, 1975.

Prior multiprocessor search algorithms typically attempt to divide the search space into subspaces that are searched in parallel by multiple processors. One disadvantage inherent in known conventional multiprocessor search algorithms is that the speedup tends to fall away from linear, i.e., saturate as the number of processors is increased. The primary reason for this saturation is related to the length of the longest running search task. A large variance in the task running times can lead to significant imbalance on the processing load placed on the different processors. This can result in a considerable amount of time being wasted by some processors while waiting for the processor executing the longest search task to finish.

In order to achieve a desired level of processing efficiency it is important that the processing task be allocated amongst the various processors such all processors finish at substantially the same time. If the processing load is well balanced, then no processor idles for an unduly long period while waiting for other processors to finish work. As a result processing speedups and efficiencies are realized over the load-imbalanced system.

It is thus one object of the invention to provide apparatus and method for allocating processing tasks that explicitly takes into account and overcomes the saturation effect.

It is another object of the invention to provide apparatus and method that overcomes the saturation effect by assigning processors in proportion to an amount of search effort in different subtrees of a search tree.

It is a further object of the invention to minimize, in a multiprocessor system, a variance in a search effort along different subtrees of a backtrack search tree employed for solving an instance of a constraint-satisfaction problem such that all processors finish their respective processing tasks at substantially the same time.

SUMMARY OF THE INVENTION

The foregoing problems are overcome and the objects of the invention are realized by apparatus and method for use in a multiprocessor system for solving an instance of a constraint-satisfaction problem with a backtrack search tree. In accordance with an aspect of the invention a method includes the steps of (a) estimating an amount of search effort required for different subtrees of the search tree, (b) allocating an appropriate number of processors to each of the different subtrees of the search tree based upon the estimated amount of search effort, the number of processors allocated to each of the subtrees being selected to minimize a variance in search processing time along the different subtrees, and (c) executing the search with the allocated processors in parallel along the different subtrees of the search tree.

The step of allocating an appropriate number of processors includes the steps of (a) dividing the search tree into $N(<M)$ subspaces, denoted as $T_1, T_2, \ldots T_N$, wherein M is a total number of processors available for conducting the search and wherein an estimated size of the subspaces is expressed as $Size(T_1), Size(T_2), \ldots, Size(T_N)$, respectively, and (b) assigning the M processors to the subspaces in proportion to the estimated effort involved in searching the subspaces.

The step of assigning is disclosed to include the steps of (a) letting $S = Size(T_i)$, (b) letting $c_i = Size(T_i)/S$, and (c) letting $a_i$ denote a number of processors to be allocated to search subspace $T_i$. The step of assigning further includes the steps of, for $1 \leq i \leq N$, (d) letting $a_i$ be the rounded value of $Mc_i$, if $a_i < 1$, (e) setting $a_i$ equal to 1, if $$\sum_{i=1}^{N} a_i < M$$

then (f) assigning an additional processor for each subspace in the sequence $T_1, T_2, \ldots$ until all M processors are allocated. If $$\sum_{i=1}^{N} a_i > M,$$

then for each subspace in the sequence $T_1, T_2, \ldots$ the method includes a step of (g) decrementing $a_i$ by 1 until $$\sum_{i=1}^{N} a_i = M.$$

BRIEF DESCRIPTION OF THE DRAWING

The above set forth and other features of the invention are made more apparent in the ensuing Detailed Description of a Preferred Embodiment of the Invention when read in conjunction with the attached Drawing, wherein.

DETAILED DESCRIPTION OF A PREFERRED EMBODIMENT OF THE INVENTION

Applications benefiting from the teaching of the invention frequently solve, by means of one or more digital data processors, constraint-satisfaction problems of the following generic form:

$$G(S) = P_1(S_1) \& P_2(S_2) \& \ldots P_M(S_M),$$

where $G(S)$ is the problem to be solved and $S = (X_1, X_2, \ldots, X_N)$ is a set of N argument variables. For $1 \leq i \leq M$, $P_i(S_i)$ is the $i^{th}$ subproblem with arguments $S_i$, where $S_i \subseteq S$. A solution to problem G is a binding of constants to each of the arguments of $P_1, P_2, \ldots, P_M$ such that a) each subproblem $P_i$ is solved, and b) each argument that is common to two or more subproblems is consistently bound to a constant value. Two solutions are distinct if the bindings are different, i.e., at least one argument is bound to two different values in the two bindings.

Figure 1:
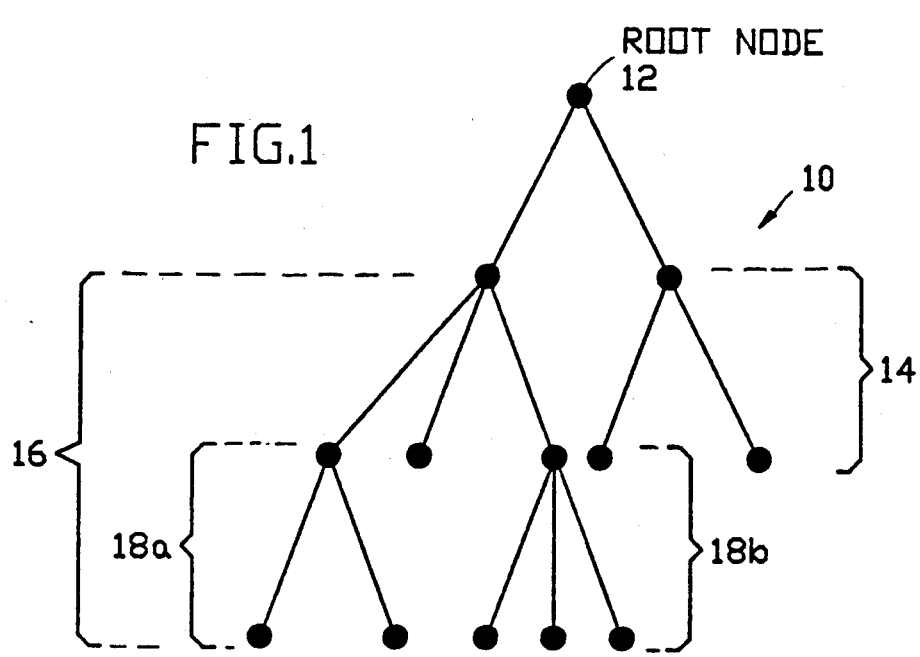
FIG. 1 is a diagram illustrating a typical backtrack search tree.

By example, in an instance of a constraint-satisfaction problem one is given the bindings of a subset of S and a computer implemented search procedure is required to enumerate all of the consistent bindings for the remainder of S. A search tree 10 of the type illustrated in FIG. 1 is utilized by the search procedure. The search tree 10 has a root node 12. Movement along the tree 10 towards the leaf nodes is referred to as forward searching while movement towards the root node 12 is referred to as backtracking. The search tree 10 is comprised of a number of subtrees, such as those indicated as 14, 16, 18a and 18b. As can be seen, the subtree 16 includes the smaller subtrees 18a and 18b. In general, the search tree 10 is comprised of a plurality of subtrees and is partitioned into disjoint subspaces. Each subtree corresponds to a subspace.

Figure 2:
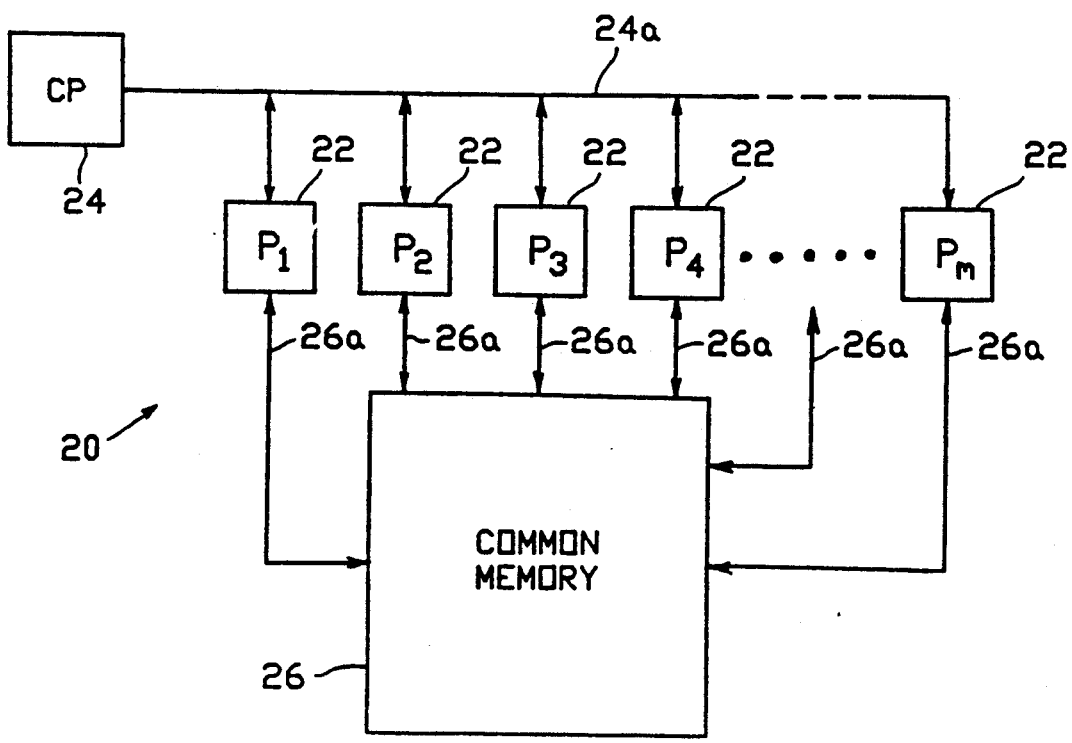
FIG. 2 is a block diagram of one embodiment of a multiprocessor system suitable for implementing the teaching of the invention.

FIG. 2 shows a simplified block diagram of an exemplary multiprocessor data processing system 20 having a plurality ($P_1$ to $P_M$) of individual, discrete data processors 22. The system 20 includes a control processor (CP) 24 that manages task allocation among the processors 22 and which also serves as an interface between users of the system 20 and the processors 22. The CP 24 includes memory and instruction execution circuitry for executing stored control programs, including search task estimation and discrete processor allocation programs as set forth below. A control bus 24a having data and control signal lines couples the CP 24 to the processors 22 and is employed in allocating processing tasks and providing data, such as data expressive of subtrees of the search tree, to the processors 22. In the illustrated system the processors 22 are each coupled via local memory buses 26a to a common memory 26. The common memory is employed by the processors 22 to communicate with one another through shared storage areas. Each processor 22 typically also includes local memory for storage of instructions and data. It should be realized that FIG. 2 illustrates but one suitable system embodiment wherein the method of the invention may be practiced and that a number of suitable multiprocessor systems having other architectures, such as distributed memory systems, can also be employed.

Figure 3:
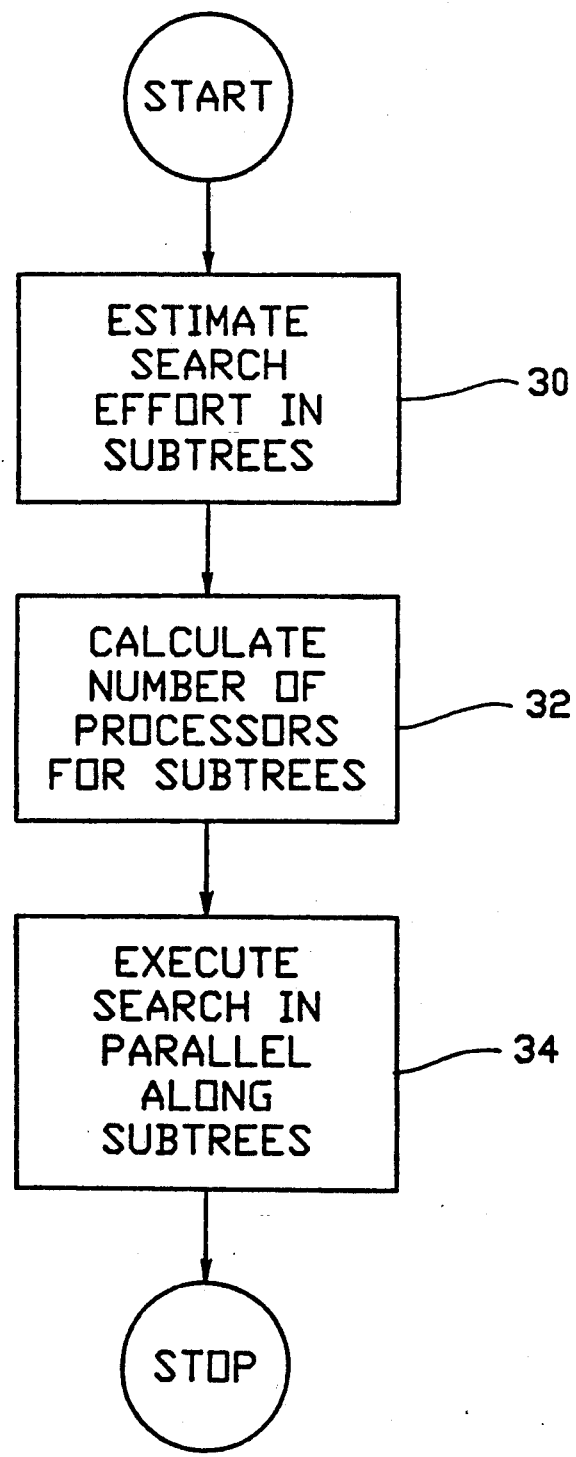
FIG. 3 is a flow chart that illustrates the steps involved in allocating processors to search subtrees of a search tree.

In accordance with the invention and as is shown in the flowchart of FIG. 3 the following three steps are accomplished to allocate a constraint-satisfaction problem backtrack tree search among the processors 22, wherein M is the total number of processors 22 in the multiprocessor system 22 that are available for conducting the tree search.

At block 30 CP 24 or some other suitable processor estimates an amount of search effort required in different subtrees of the search tree 10. At block 32 the CP 24 calculates or otherwise determines an appropriate number of the processors 22 to allocate to each of the different subtrees of the search tree 10. At block 34 the tree search is executed in parallel by the selected processors 22 along the different subtrees of the search tree 10.

The first step shown in block 30 of FIG. 3, namely estimating an amount of search effort required in different subtrees of the search tree, can be accomplished using known techniques. In particular, a sampling method described in a journal article by D. E. Knuth, "Estimating the Efficiency of Backtrack Programs", Mathematics of Computation, Vol. 29, 1975, pp. 121-136 or a deterministic estimation method as described in an article "Estimating The Size Of A Backtrack Search During The Search Operation", IBM Technical Disclosure Bulletin, Vol. 30, No. Jan. 8, 1988 can be used to accomplish the step of block 30.

The last step of the method shown in FIG. 3, namely block 34 wherein the search is executed in parallel by the selected processors along the different subtrees of the search tree, may also be accomplished using a known technique such as that described in an article "Parallel-Lookahead Technique For Constraint Satisfaction", IBM Technical Disclosure Bulletin, Vol. 31, No. Mar. 10, 1989.

Figure 4:
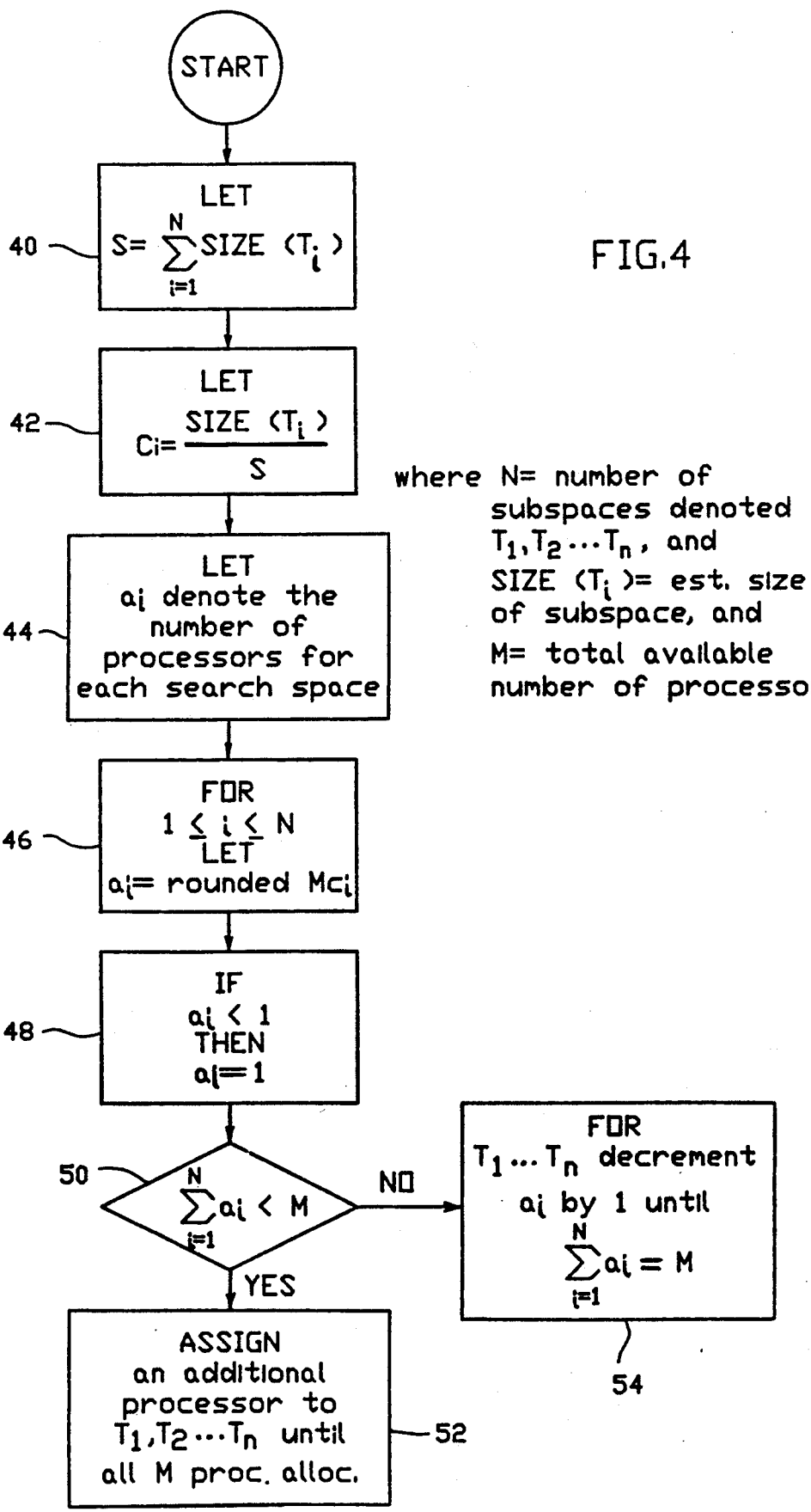
FIG. 4 is a detailed flow chart that illustrates the method of the invention of determining a number of processors assigned to each subtree of the search tree.

In accordance with a presently preferred method of the invention, as shown in the block diagram of FIG. 4, the step of block 32 of calculating or otherwise determining an appropriate number of the processors 22 to allocate to each of the different subtrees of the search tree 10 is now described in detail.

Referring to FIG. 4 the search tree is divided into $N(<M)$ subspaces, denoted as $T_1, T_2, \ldots T_N$. The estimated sizes of these subspaces are expressed as $Size(T_1), Size(T_2), \ldots, Size(T_N)$ respectively. Without loss of generality, it is assumed that $Size(T_1) \geq Size(T_2) \geq Size(T_N)$.

In accordance with the invention an appropriate number of processors 22 for pursuing the search in each subspace is determined in a manner that tends to minimize the variance of the completion times of the individual subspaces. This determination involves letting $$S = \sum_{i=1}^{N} Size(T_i) \text{ (block 40);}$$

letting $c_i = Size(T_i)/S$ (block 42); and letting $a_i$ denote the number of processors 22 allocated to search the subspace $T_i$ (block 44). For $1 \leq i \leq N$, let $a_i$ be the rounded value of $Mc_i$ (block 46). If $a_i<1$, then $a_i$ is set to 1 at block 48. If $a_i<M$ (block 50), then there is assigned an additional processor 22 for each subspace in the sequence $T_1, T_2, \ldots$, until M processors 22 have been allocated (block 52). If $$\sum_{i=1}^{N} a_i > M,$$

then for each subspace in the sequence $T_1, T_2, \ldots$, $a_i$ is decremented by 1 until $$\sum_{i=1}^{N} a_i = M \text{ (block 54)}.$$

In accordance with the invention the set forth above operate to assign M processors to the subspaces in proportion to the estimated effort involved in searching the subspaces.

If there are many search tasks for which $a_i<1$, then a number of such tasks are preferably combined and allocated to a single one of the processors 22. In general, any method of processor allocation that seeks to evenly distribute the estimated search effort among the processors of a multiprocessor system as a function of estimated search effort may be employed.

As such, while the invention has been particularly shown and described with respect to a preferred embodiment thereof, it will be understood by those skilled in the art that changes in form and details may be made therein without departing from the scope and spirit of the invention.

Having thus described my invention, what I claim as new, and desire to secure by Letters Patent is:

1. In a multiprocessor system, a method of solving an instance of a constrain-satisfaction problem with a backtrack search tree, comprising the steps of:

estimating an amount of search effort required for different subtrees of a backtrack search tree;

allocating an appropriate number of processors to each of the different subtrees of the backtrack search tree based upon the estimated amount of search effort, the number of processors allocated to each of the subtrees being selected to minimize a variance in search processing time along the different subtrees; and executing the search in a parallel manner with the allocated processors along the different subtrees of the backtrack search tree; wherein the step of allocating an appropriate number of processors includes the steps of:

dividing the backrack search tree into N(<M) subspaces, denoted as $T_1, T_2, \ldots T_N$, wherein M is a total number of processors available for conducting a backtrack search and wherein an estimated size of the subspaces is expressed as $Size(T_1), Size(T_2), \ldots, Size(T_N)$, respectively; and assigning the M processors to the subspaces in proportion to the estimated effort involved in searching the subspaces; and wherein the step of assigning includes the steps of: letting $$S = \sum_{i=1}^{N} Size(T_i);$$

letting $c_i = Size(T_i)/S$;

letting $a_i$ denote a number of processors to be allocated to search subspace $T_i$;

for $1 \leq i \leq N$, letting $a_i$ be the rounded value of $Mc_i$;

if $$\sum_{i=1}^{N} a_i < M$$

then assigning an additional processor for each subspace in the sequence $T_1, T_2, \ldots$ until all M processors are allocated;

else if $$\sum_{i=1}^{N} a_i > M,$$

then for each subspace in the sequence $T_1, T_2, \ldots$ decrementing $a_i$ by 1 until $$\sum_{i=1}^{N} a_i = M.$$

2. A method as set forth in claim 1 wherein for the condition $a_i<1$ the method includes the steps of combining search tasks and allocating the combined search tasks to a single processor.

3. In a multiprocessor data processing system, processor allocation apparatus for minimizing a variance of search effort along different subtrees of a backtrack search tree employed for solving an instance of a constraint-satisfaction problem, comprising:

means for estimating an amount of backtrack search effort required in different subtrees of a backtrack search tree; and means, responsive to the estimated amount of backtrack search effort, for allocating an appropriate number of the processors for the different subtrees of the backtrack search tree, said allocating means comprising means for partitioning the backtrack search tree into N(<M) subspaces, denoted as $T_1, T_2, \ldots T_N$, wherein M is a total number of processors available for conducting the backtrack search and wherein an estimated size of the subspaces is expressed as $Size(T_1), Size(T_2), \ldots, Size(T_N)$, respectively; and means for assigning M processors to the subspaces in proportion to an estimated effort involved in searching each of the subspaces.

4. A multiprocessor data processing system as set forth in claim 3 wherein the M processors are each coupled to a common data memory means.

5. A multiprocessor data processing system as set forth in claim 3 wherein the M processors each comprise means for executing the backtrack search in a parallel manner along different subtrees of the backtrack search tree.

6. A multiprocessor data processing system as set forth in claim 3 wherein the means for estimating and the means for allocating comprise a control data processor coupled in common to each of the M processors.

7. In a multiprocessor data processing system including a plurality of discrete data processing units, a method of solving an instance of a constraint-satisfaction problem with a backtrack search tree, comprising the steps of:

estimating with a control data processor an amount of backtrack search effort required for different subtrees of a backtrack search tree;

allocating with the control data processor one or more of the discrete data processing units to each of the different subtrees of the backtrack search tree, a number of discrete data processing units allocated to each subtree being selected as a function of the estimated amount of backtrack search effort so as to minimize a variance in backtrack search processing time along the different subtrees; and executing the backtrack search in a parallel manner with the allocated processing units along the different subtrees of the backtrack search tree; wherein the step of allocating includes the steps of:

partitioning the backtrack search tree into $N(<M)$ subspaces, denoted as $T_1, T_2, \ldots T_N$, wherein M is a total number of processing units available for conducting the backtrack search and wherein an estimated size of the subspaces is expressed as $Size(T_1), Size(T_2), \ldots, Size(T_N)$, respectively; and assigning the M processing units to the subspaces in proportion to an estimated amount of effort involved in performing the backtrack search of the subspaces.

8. A method as set forth in claim 7 wherein the step of assigning includes the steps of:

letting $$S = \sum_{i=1}^{N} Size(T_i);$$

letting $c_i = Size(T_i)/S$;
letting $a_i$ denote a number of processing units to be allocated to search subspace $T_i$;
for $1 \leq i \leq N$,
letting $a_i$ be the rounded value of $Mc_i$;
if $a_i < 1$, then setting $a_i$ equal to 1;
if $$\sum_{i=1}^{N} a_i < M$$

then assigning an additional processing unit for each subspace in the sequence $T_1, T_2, \ldots$ until all M processing units are allocated;
else
if $$\sum_{i=1}^{N} a_i > M,$$

then for each subspace in the sequence $T_1, T_2, \ldots$ decrementing $a_i$ by 1 until $$\sum_{i=1}^{N} a_i = M.$$

9. A method as set forth in claim 8 wherein for the condition $a_i < 1$ method includes the steps of combining search tasks; and allocating the combined search tasks to a single processing unit.

* * * * *

UNITED STATES PATENT AND TRADEMARK OFFICE
CERTIFICATE OF CORRECTION

PATENT NO. : 5,146,540

DATED : September 8, 1992

INVENTOR(S) : Kadathur S. Natarajan

It is certified that error appears in the above-identified patent and that said Letters Patent is hereby corrected as shown below:

In Claim 1, col. 5, line 53 "backrack" should read --backtrack--.

In Claim 1, col. 6, line 6 after "if" insert --$a_i < 1$, then setting $a_i$ equal to 1; if--.

Signed and Sealed this

Thirty-first Day of August, 1993

Attest:

BRUCE LEHMAN

*Attesting Officer*     *Commissioner of Patents and Trademarks*